(12) United States Patent
Park (10) Patent No.: US 7,979,093 B2
(45) Date of Patent: Jul. 12, 2011

(54) PORTABLE TERMINAL AND METHOD FOR DISPLAYING PREFERENCE ITEM THEREIN

(75) Inventor: Eu Gene Park, Seoul (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 895 days.

(21) Appl. No.: 11/978,838

(22) Filed: Oct. 30, 2007

(65) Prior Publication Data

US 2008/0268910 A1 Oct. 30, 2008

(30) Foreign Application Priority Data

Apr. 30, 2007 (KR) .................. 10-2007-0041886

(51) Int. Cl.
*H04B 1/38* (2006.01)

(52) U.S. Cl. ..................... 455/566; 455/575.1

(58) Field of Classification Search ............... 455/456.1, 455/456.2, 73, 550.1, 566, 567, 575.1, 90.1; 345/169, 170, 171, 173
See application file for complete search history.

(56) References Cited

U.S. PATENT DOCUMENTS

| 6,600,936 | B1 * | 7/2003 | Karkkainen et al. | 455/566 |
|---|---|---|---|---|
| 2004/0075682 | A1 | 4/2004 | Burleson | |
| 2005/0240874 | A1 | 10/2005 | Kiesekamp et al. | |
| 2007/0050837 | A1 | 3/2007 | Lopez-Estrada | |
| 2009/0005076 | A1 * | 1/2009 | Forstall et al. | 345/173 |
| 2009/0048000 | A1 * | 2/2009 | Ade-Hall | 455/566 |

FOREIGN PATENT DOCUMENTS

| JP | 2000-231371 | 8/2000 |
|---|---|---|
| JP | 2001-243243 | 9/2001 |
| JP | 2005-242964 | 9/2005 |
| KR | 2004-44692 | 5/2004 |
| KR | 2004-99022 | 11/2004 |
| KR | 2006-99610 | 9/2006 |
| KR | 10-0661179 | 12/2006 |

* cited by examiner

*Primary Examiner* — Thanh C Le
(74) *Attorney, Agent, or Firm* — Cha & Reiter, LLC (57) ABSTRACT

A portable terminal and a method for displaying a preference item in the portable terminal that provides a distinguishing view of the preferential item(s). The method includes: displaying, upon receipt of a request to display an item list, the item list; checking, while searching the item list, whether a preference is set for an item to be displayed; and applying, if a preference is set for an item to be displayed, an event to the preference item and displaying the preference item. Applying an event to the preference item and displaying the preference item may include: determining the event that is set for the preference item, and applying the event to the preference item and displaying the preference item.

16 Claims, 7 Drawing Sheets

PORTABLE TERMINAL AND METHOD FOR DISPLAYING PREFERENCE ITEM THEREIN

CLAIM OF PRIORITY

This application claims priority from an application entitled "PORTABLE TERMINAL AND METHOD FOR DISPLAYING PREFERENCE ITEM THEREIN," filed in the Korean Intellectual Property Office on Apr. 30, 2007 and assigned Serial No. 2007-0041886, the contents of which are incorporated herein by reference in its entirety.

BACKGROUND OF THE INVENTION

1. Field of the Invention

The present invention relates to a portable terminal and a method for displaying a preference item in the portable terminal. More particularly, the present invention relates to a portable terminal capable of displaying a preference item including but not limited to bookmark functions to which an event is applied, as well as searching and identifying preference items menus, and a method for displaying a preference item in the portable terminal.

2. Description of the Related Art

Portable terminals are now being used in an ever-increasing variety of applications due to their easy-to-carry design, storage and playback functions of various execution programs, and widespread usage of embedded options. Portable terminals provide voice communication features, video services such as multimedia services, music playback and file viewer functions, and bookmark functions. In particular, a bookmark function refers to a function that enables a user to register an address of a favored or important website during Internet use on a computer, which can then be readily accessed at a later date without having to remember the address or sift through the results of a search engine. That is, the bookmark function allows a user to easily recognize and find their favorite items.

A portable terminal uses a bookmark option in a conventional way so as to organize items including a user's favorite items, such as frequently accessed website addresses, menus and files, into separate lists. In this case, the user cannot recognize their favorite items in each of the separate lists until they locate a screen displaying the particular list of favorite items. However, it is difficult for the user to find, for example, bookmark files in a file list because the bookmark files are not displayed in a manner distinguishable from other files. For the same reason, it is can be difficult to identify a bookmark menu while searching menus for bookmark menus. Thus, there is a long felt need in the art to provide a user's favorite files or menus that are more easily recognized than known in the art.

SUMMARY OF THE INVENTION

In order to solve at least some of the above-mentioned problems, the present invention provides in part a portable terminal capable of displaying a preference item to which an event is applied and a method for displaying a preference item in the portable terminal that enables the display of a preference item in a manner distinguishable from other items.

In accordance with an exemplary embodiment of the present invention, a method for displaying a preference item in a portable terminal may include: displaying, upon receipt of a request to display an item list, the item list; checking, while searching the item list, whether a preference is set for an item to be displayed; and applying, if a preference is set for an item to be displayed, an event to the preference item and displaying the preference item. Applying an event to the preference item and displaying the preference item may include: determining the event that is set for the preference item; and applying the event to the preference item and displaying the preference item.

In accordance with another exemplary embodiment of the present invention, a portable terminal may include: a display unit for displaying an item list; an input unit having a key for searching the item list; a storage unit for storing items and information about preference setting of the items; and a controller for controlling the display unit, the input unit, and the storage unit and applying, if a preference is set for an item to be displayed while searching the item list, an event to the preference item for which the preference is set. The event searched for may include at least one of a time delay, a change of color, a change of font, a change of character size, a display of a pop-up window, and/or an activation of an alarm.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Hereinafter, exemplary embodiments of the present invention are described in detail with reference to the accompanying drawings. The same reference symbols identify the same or corresponding elements in the drawings. Detailed descriptions of constructions or processes known in the art may be omitted to avoid obscuring appreciation of the invention by a person of ordinary skill in the art with unnecessary detail regarding such known constructions or processes. In addition, particular terms may be defined so as to describe the invention in the best mode known to the inventors. Accordingly, the meaning of specific terms or words used in the specification and the claims should not be limited to the literal or commonly employed sense, but should be construed in accordance with the spirit of the invention as used herein. The description of the various exemplary embodiments is to be construed as being provided for illustrative purposes only and does not describe every possible instance of the invention. Therefore, it should be understood and appreciated by a person of ordinary skill in the art that various changes may be made and equivalents may be substituted for elements of the invention at the time of application of the present invention.

In the exemplary embodiments described, the term "items" refers to items included but not limited to image files, text files, audio (such as MP3) files, motion video files, and menus that can be stored and/or accessed in a portable terminal. The term "preference item" typically refers to an item for which a preference is set. The term "event" typically refers to a feature used to display a preference item in a distinguishable manner from other items. In the exemplary embodiments below, for convenience of explanation and understanding, a user's separate setting for items with a priority or preference is referred to by the term "preference setting", however setting a preference for an item may also be known as bookmarking or dog-earring.

Although a portable terminal according to an exemplary embodiment of the present invention is a mobile communication terminal, the portable terminal may be any type of multimedia information and communication device including a Personal Digital Assistant (PDA), Smart Phone, International Mobile Telecommunication 2000 (IMT-2000) terminal, Code Division Multiple Access (CDMA) terminal, Global System for Mobile communication (GSM) terminal and Universal Mobile Telecommunication Service (UMTS) terminal, and applications thereof.

Figure 1:
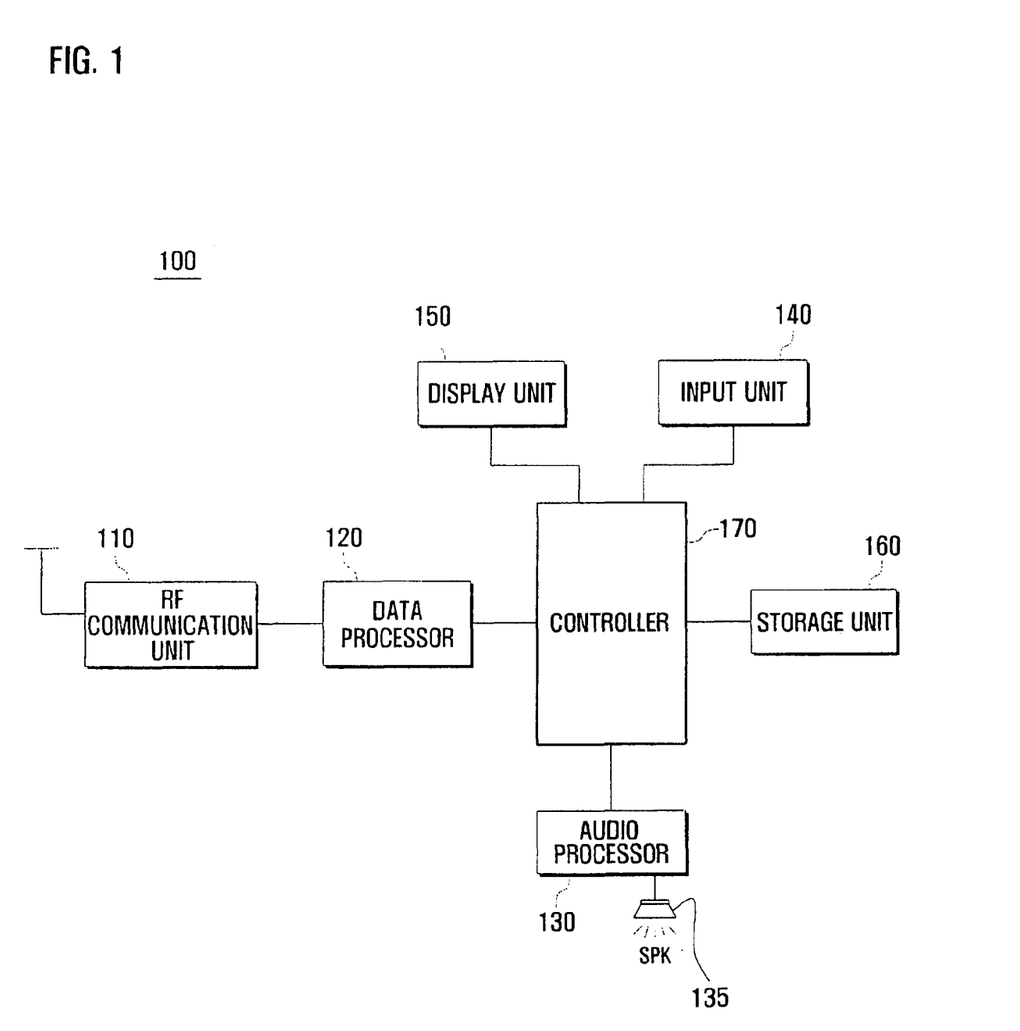
FIG. 1 is a schematic block diagram illustrating a configuration of a portable terminal according to an exemplary embodiment of the present invention.

FIG. 1 is a schematic block diagram illustrating a configuration of a portable terminal 100 according to an exemplary embodiment of the present invention. Referring to FIG. 1, the portable terminal 100 includes a radio frequency (RF) communication unit 110, a data processor 120, an audio processor 130, an input unit 140, a display unit 150, a storage unit 160, and a controller 170.

The RF communication unit 110 is controlled by the controller 170 in order to establish a communication channel between the portable terminal 100 and a base station (not shown) for data communication and voice calls, and wirelessly transmits and receives user data using the communication channel. The RF communication unit 110 transmits and receives content and a control signal associated with the content through a connection to an external web server. The RF communication unit 110 includes a tuner that tunes to a given channel frequency and extracts a signal carried over the channel frequency, an RF transmitter that up-converts the frequency of a signal to be transmitted and amplifies the signal, and an RF receiver that low-noise amplifies a received signal and down-converts its frequency.

Still referring to FIG. 1, the data processor 120 processes audio data received from the audio processor 130, numeric and character data input by a user, and data received from the RF communication unit 110. The data processor 120 typically includes a transmitter that encodes and modulates a signal to be transmitted through the RF communication unit 110 and a receiver that demodulates and decodes a received signal. The data processor 120 also typically includes a data codec for processing incoming data. such as packet data, and an audio codec for processing audio signals such as voice.

The audio processor 130 reproduces an audio signal received from the controller 170 and outputs an audio signal such as voice input through a microphone MIC to the data processor 120. In other words, the audio processor 130 is controlled by the controller 170 to convert audio and sound data into audible sound and output the audible sound through a speaker SPK 135. For example, if an event applied when a preference item is displayed is an alarm, the audio processor 130 is controlled by the controller 170 to output an alarm tone corresponding to the alarm.

The input unit 140 receives numeric and character information input by a user and includes a plurality of input and function keys for setting various functions. The function keys may include arrow keys, side keys, and shortcut keys that are set to perform specific functions. The input unit 140 also outputs a key signal for controlling the functions of the portable terminal 100 to the controller 170. In particular, upon receipt of a request from the user to set up a file search, file list, and preferences, the input unit 140 generates key signals corresponding to the request and outputs the key signals to the controller 170. It is within the spirit of the invention and the scope of the appended claims that the input unit could optionally include a voice activated input in addition to key signals, which although at the present time would somewhat increase the complexity and size of the terminal, continued miniaturization of components will increase the desirability of including such a feature.

Still referring to FIG. 1, the display unit 150 displays various menus of the portable terminal 100, user data input by the user, function setting information, and various other information provided to the user. The display unit 150 may comprise any of a variety of types, but in this example is preferably a liquid crystal display (LCD). When the LCD is implemented using a touch screen technology, for example, the display unit 150 may be incorporated into an input portion.

The storage unit 160 shown in FIG. 6 typically stores execution programs for performing functions according to the present exemplary embodiment, such as downloaded content, user data generated by the user, and data being transmitted and received during communications. The storage unit 160 may include one or more buffers for temporarily storing user data generated during the execution of an execution program such as a text message execution program. The storage unit 160 may include a program area and a data area.

The controller 170 performs the overall control operation of the portable terminal 100 and a signal flow between internal elements of the portable terminal 100. The controller 170 may also perform the functions of the data processor 120 and it is within the spirit and scope of the invention that such components and/or their functionality can be integrated.

For example, the controller 170 searches for the list of items requested and controls the display unit 150 to display the list of items upon receipt of a user's request for a list of items stored in the portable terminal 100, such as MP3 files, text files, or video files. Furthermore, if the user selects an item from the list of items and requests that a preference be set for the selected item, the controller 170 sets a preference for the item. In this case, setting a preference is accomplished by applying an event to a user's preference item so that the preference item can be displayed in a distinguishable manner from other files.

For example, a preference item may be displayed in a distinguishable manner by using time delay, i.e., displaying for a longer time duration than that for which other items are displayed. The preference item may be displayed in thicker and darker characters than other items, or in different colors, or it could flash blink, or be underlined, highlighted, have a character (such as, for example, an asterisk) before and your after, or it could keep changing colors, font, size, display for a longer duration, and/or any combination thereof. It is also within the spirit of the invention and the scope of the appended claims that the preference items could be ranked, whereby the user selects certain preference items as being more critical or desirable than others, and the level of distinguishment can correspond to the ranking. Thus, for example, if item A is more important to a user than item B, item A may be on longer and flash or change font or size, whereas item B might just be on longer. Also, when a plurality of items are identified as preference items, the event is applied to each one of the plurality of preference items could be the same or different. The invention may also include a plurality of items lists, and ranking each of the plurality of item lists and/or preference items within each list.

Moreover, the controller 170 may control the display unit 150 to display a preference item using a vibration, lamp, or alarm so as to inform a user that a preference has been set for the item. There could be, for example, a speech file such as a .WAV file that states "preference set" so the user is provided with audio confirmation.

That is, the controller 170 applies an event such as time delay, display of a pop-up window, alarm, and change of the manner of display to a preference item being displayed, thus enabling a user to easily identify the preference item.

A person of ordinary skill in the art understand and appreciates that the block diagram in FIG. 1 of an example of a portable terminal 100 according to the present invention may have various other configurations than shown and described. For example, the portable terminal 100 according to the present invention may further include a digital broadcasting module and a portable (wireless) Internet module depending on the type of application.

Now referring to the flowchart in FIG. 2, an exemplary method for displaying a preference item in the portable terminal 100 having the above-mentioned configuration according to an exemplary embodiment of the present invention of FIG. 1 is described herein below.

Figure 2:
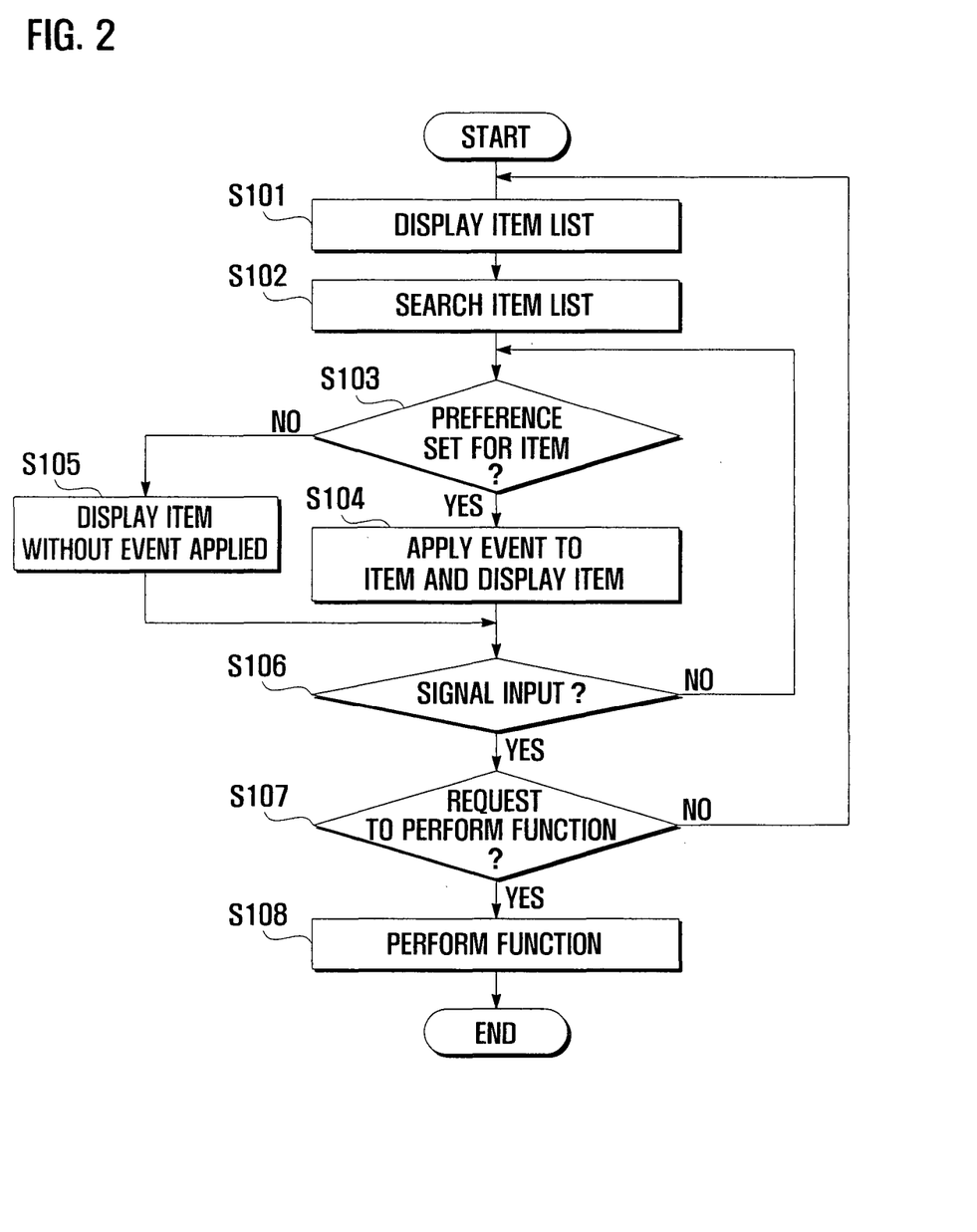
FIG. 2 is a flowchart illustrating a method for displaying a preference item in a portable terminal according to an exemplary embodiment of the present invention.

As shown in FIG. 2, upon receipt of a user request for an item list, the controller 170 detects the request and controls the display unit 150 to display the requested item list (S101). If the user inputs a search request for the item list using an arrow key on the input unit 140, the controller 170 searches the item list (S102) for the item. While searching the item list, the controller 170 checks whether a preference has been set for an item that is to be displayed (S103). If a preference has been set for an item that is to be displayed, the controller 170 applies an event to the item and controls the display unit 150 to display the item to which the event is applied (S104). In this example, the "event" means a feature used to display a preference item, such as a time delay, change of the manner of display, and display of a pop-up window, etc. The user may select an event for setting or set an event for each item.

Figure 3A:
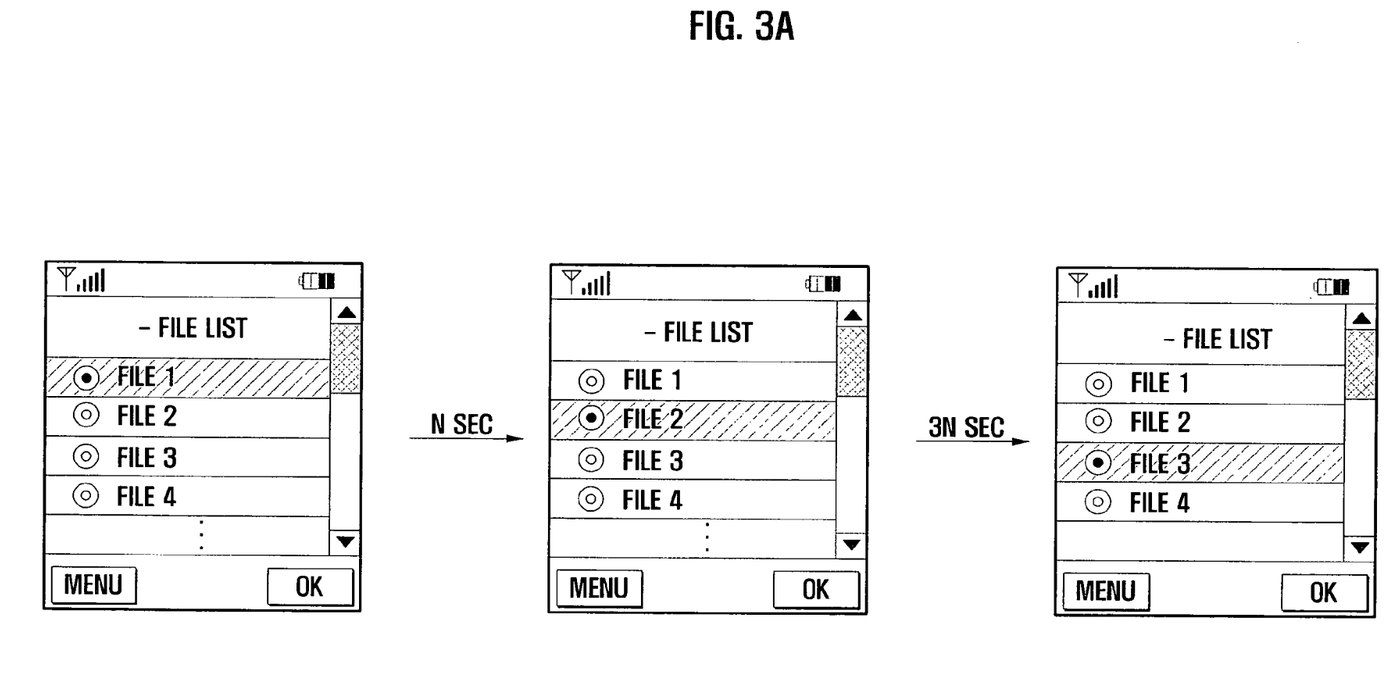
FIGS. 3A-3C show exemplary representations of display screens illustrating an example of applying the method for displaying a preference item of FIG. 2.

An example in which a time delay is applied to a preference item as an event is described with reference to FIGS. 1 and 3A-C. It is assumed herein that a non-preference item is displayed for n seconds, and a preference item is displayed for 3n seconds. Referring to FIG. 3A, when a pointing cursor is located at File 1, the controller 170 controls the display unit 150 to display File 1 in a darker shade than other files. It should be understood, for example, that the display of the file name could be darker or the background around the file name could be a different shade. Also, an artisan appreciates that any type of visual difference, darkness, brightness, contrast, color, hue, etc. can be used.

When a user moves the pointing cursor from File 1 to File 2, if File 1 is not a preference file, after a lapse of n seconds the controller 170 controls the display unit 150 to display File 2 in a darker shade. If File 2 is a preference file, after a lapse of 3n seconds the controller 170 controls the display unit 150 to display File 3 in a darker shade. That is, a time delay is applied to File 2, which is a preference file, before moving the pointing cursor to File 3.

Figure 3B:
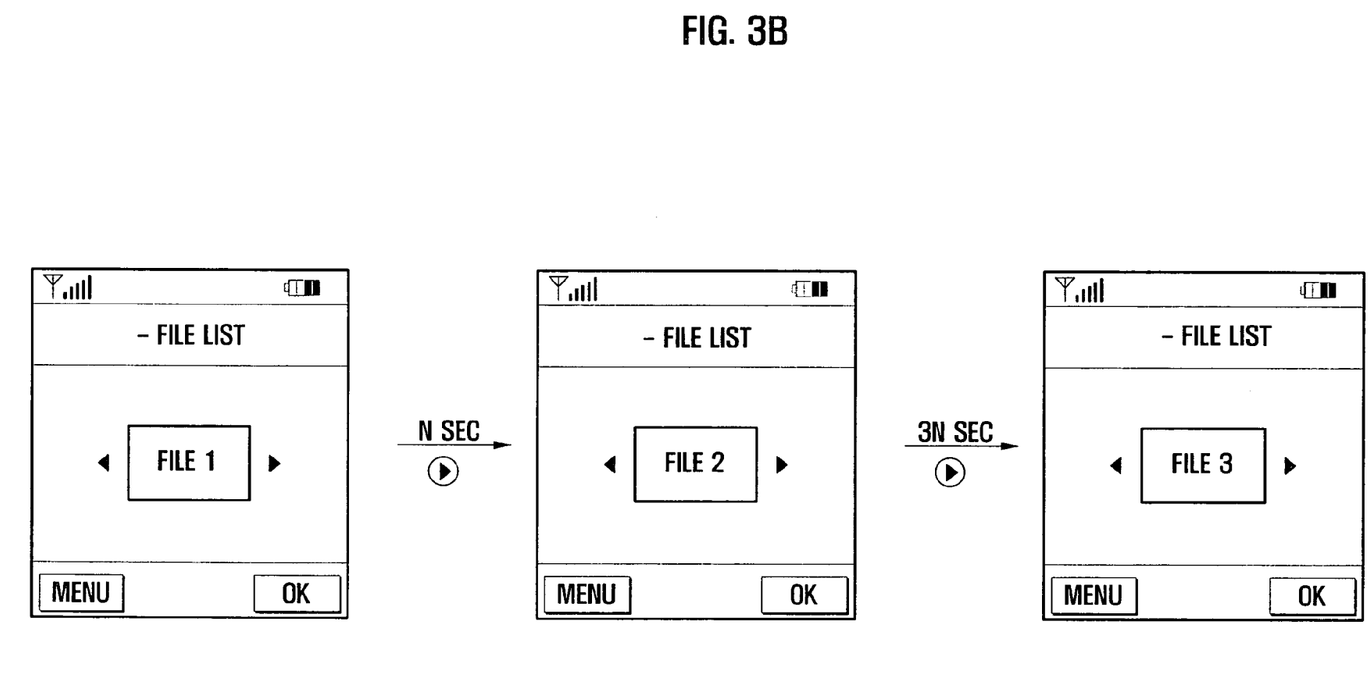

Referring now to FIG. 3B, if the user makes a search request to move to File 2 when File 1 is displayed on the display unit 150, the controller 170 controls the display unit 150 to display File 2 after a lapse of n seconds. Upon receipt of a search request to move from File 2 to File 3, the controller 170 controls the display unit 150 to display File 3 after a lapse of 3n seconds. By applying a time delay event to the preference file in this way, the user can easily recognize the preference file.

Figure 3C:
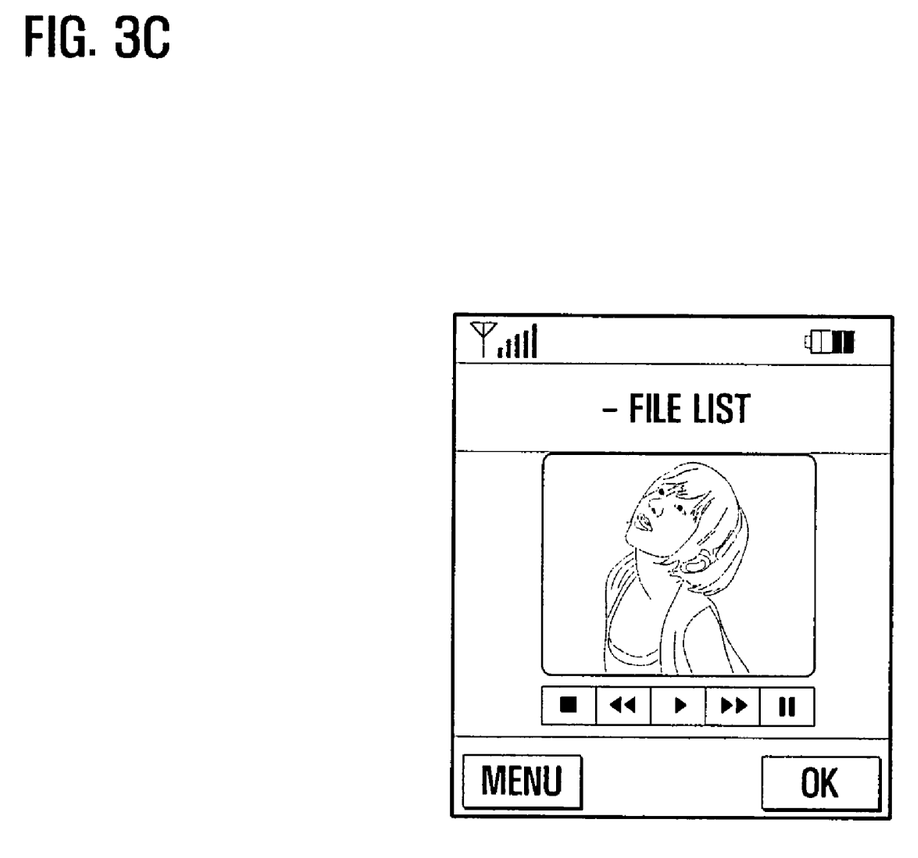

Further, according to an exemplary method for displaying a preference item in the portable 100 of the present invention, a preference can be set for a specific scene in a motion video stored in the portable terminal 100. ore specifically, referring to FIG. 3C, if the user pauses during playback of a motion video to view a specific scene and makes a request to set a preference for the paused scene, the controller 170 sets a preference for the paused scene. Thereafter, if the user makes a request for playback of the motion video, the controller 170 pauses during playback to view the scene for which a preference has been set and resumes playback from the paused state, thus enabling the user to easily recognize that a preference has been set for the paused scene.

Figure 4A:
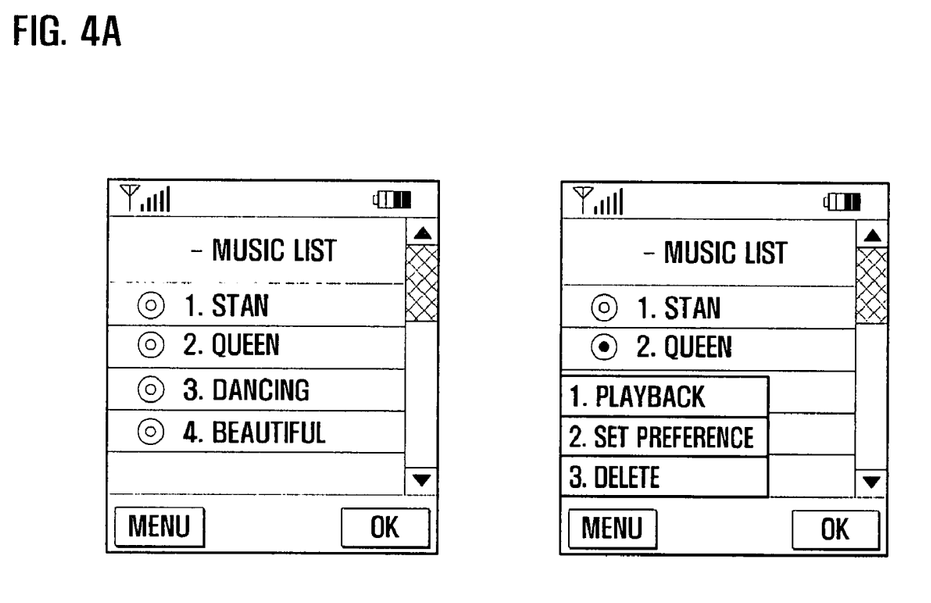
FIGS. 4A and 4B show exemplary representations of display screens illustrating another example of applying the method for displaying a preference item of FIG. 2.
Figure 4B:
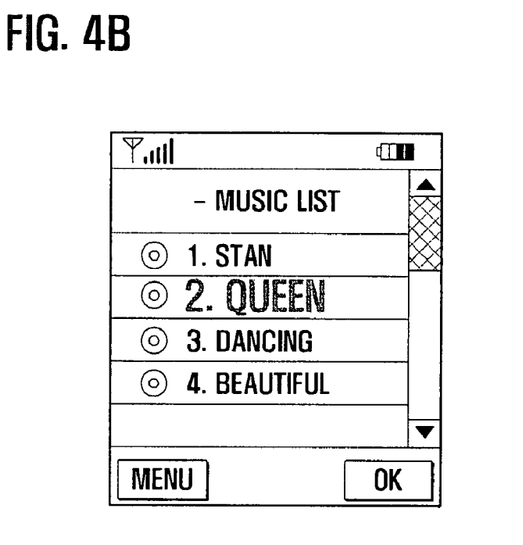

FIGS. 4A and 4B provide illustrations of an example in which a preference item is displayed in a distinguishable manner from other items. According to the example, a preference file in an MP3 file list, for which a preference is set, can be displayed in the portable terminal 100 in a different color, shade of a color and/or thickness of text from those of non-preference files.

If the user makes a request for an MP3 file list, the MP3 file list is displayed as illustrated in FIG. 4A, in the order of filename or storage date or in random order. The order in which the files of the MP3 file list are displayed is set by the user. Referring to FIG. 4A, if a user inputs a menu key while the MP3 file list is displayed, the controller 170 controls the display unit 150 to display a menu tree. According to the present invention, the menu tree contains sub-menus such as Playback, Set Preference, and Delete, but is not limited thereto. For example, the menu tree may further include Repeat, Cancel, and Transfer. Referring to FIG. 4B, if the user selects Set Preference for 'Queen' file on track 2, the controller 170 sets a preference for the 'Queen' file and controls the display unit 150 to display the 'Queen' file in a different color and thickness from those of non-preference files.

Figure 5:
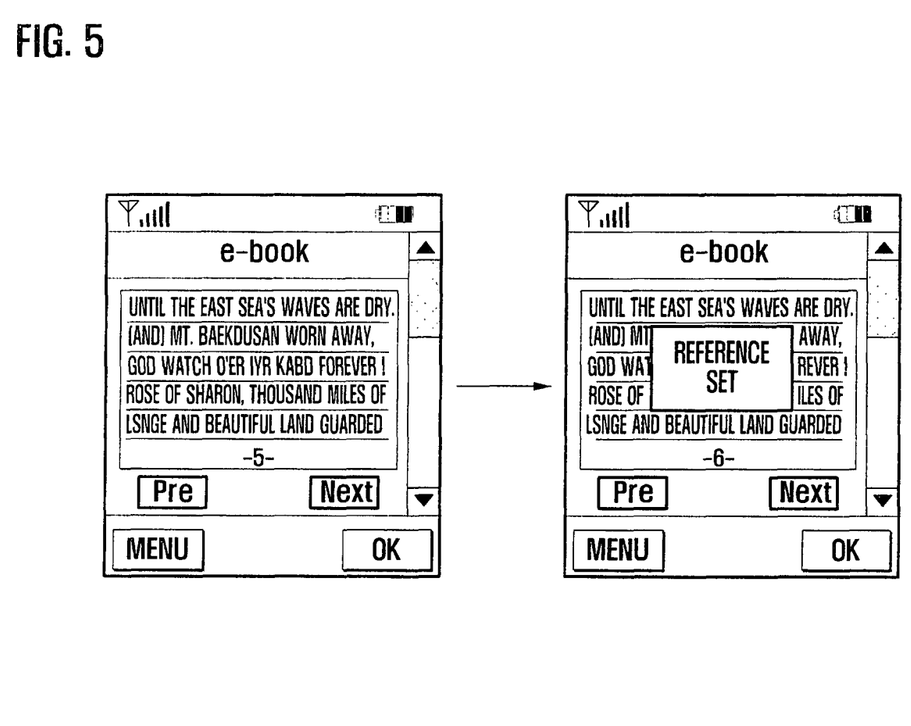
FIG. 5 provides exemplary representations of screens illustrating another example of applying the method for displaying a preference item of FIG. 2.

FIG. 5 shows another example of the present invention, wherein a pop-up event may be applied to a preference item so as to notify a user of the preference item. Referring to FIG. 5, it is assumed that a preference is set for Page 6 of an electronic book (e-book). If a user inputs a Next key while Page 5 of the e-book is displayed, the controller 170 converts the Page 5 to the Page 6 on the e-book and checks whether a preference is set for the Page 6. If a preference is set for the Page 6, the controller 170 controls the display unit 150 to display a pop-up window indicating that a preference is set for the Page 6. That is, the controller 170 can notify the user that a preference is set for the Page 6 by displaying a pop-up window on the same page, thus enabling the user to easily recognize the preference page. The controller 170 may also control the display unit 150 to display a preference item using at least one of a vibration alarm, a lamp alarm, and an alarm tone, thus enabling the user to quickly recognize the preference item.

Referring back to the exemplary flowchart in FIG. 2, if a preference is not set for an item that is to be displayed at step S103, the controller 170 controls the display unit 105 to display the item without an event applied (S105). If a signal is input for the item displayed at step S104 or at step S105 (S106), the controller 170 checks whether the input signal represents a request to perform a function on the displayed item (S107). If the input signal represents a request to perform a function on the displayed item, the controller 170 performs the function (S108).

Still referring to FIG. 2, if a signal is not input for the displayed item at step S106, the process returns to step S103 and the controller 170 determines whether a preference is set for the next item to be displayed.

As described in the above examples, a portable terminal and a method capable of displaying a preference item according to the present invention enables display of a preference item in a distinguishable manner from other items by applying an event to the preference item being displayed during a search for items, thus enabling the user to easily recognize the preference item.

Although exemplary embodiments of the present invention have been described in detail hereinabove, it should be clearly understood that many variations and modifications of the basic inventive concepts herein taught which may appear to those skilled in the present art will still fall within the spirit of the present invention and scope of the appended claims.

What is claimed is:

1. A. method for displaying a preference item in a portable terminal, the method comprising:
    displaying an item list upon receipt of a request to display the item list;
    checking, while searching the item list, whether a preference is set for an item in the item list to he displayed as a preference item;
    determining an associated event, defined by a time delay, that is set for the preference item; and
    applying, if a preference is set for the item to be displayed, the associated event to the preference item and displaying the preference item,
    wherein upon receipt of a request to change the display from the preference item to another item in the item list, the other item is displayed after the time delay has elapsed.

2. The method of claim 1, wherein, if the preference item is a motion video, a specific scene in the motion video for which the preference is set is paused until the time delay has elapsed.

3. The method of claim 1, wherein the associated event applied to the preference item comprises displaying the preference item by changing at least one of the original color, character size, and font of the preference item.

4. The method of claim 1, wherein the preference item is displayed with a pop-up window.

5. The method of claim 1, wherein, upon displaying the preference item, at least one of a vibration alarm, a lamp alarm, an alarm tone and speech file is activated.

6. The method of claim 1, wherein the item is at least one of an audio file, a motion video file, an image file, a text file, and a menu stored in the portable terminal.

7. The method of claim 1, wherein the item comprises a link to an audio file, motion file video, an image file, a text file, and a menu stored remotely from. the portable terminal.

8. A method for displaying a preference item in a portable terminal, the method comprising:
    displaying an item list upon receipt of a request to display the item list;
    checking, while searching the item list, whether a reference is set for an item in the item list to be displayed as a preference item; and
    applying, if a preference is set for the item, to be displayed, an associated event to the preference item and displaying the preference item,
    wherein a plurality of items is identified as preference items, and the event is applied to each one of the plurality of preference items, and wherein the plurality of preference items are ranked in terms of importance, and the event associated with each one of the preference items is based on the rank.

9. The method according to claim 8, further comprising displaying a plurality of items lists, and ranking each of the plurality of item lists and preference items within each list.

10. A portable terminal, comprising:
    a display unit for displaying an item list;
    an input unit having a key for searching the item list;
    a storage unit for storing items and information about preference setting of the items; and
    a controller for controlling the display unit, the input unit, and the storage unit and applying, if a preference is set for an item to be displayed while searching the item list as a preference item, an event to the preference item for which the preference is set, wherein, if the event set comprises a time delay, upon receipt of a search request to move from the preference item to another item, the controller delays the movement from the preference item to the other item by a preset time duration.

11. The terminal of claim 10, wherein the event comprises at least one of a time delay, change of color, change of shade, change of font, change of character size, display of a pop-up window, and activation of an alarm.

12. The terminal of claim 10, wherein, if the preference item comprises a motion video, the controller pauses to view a specific scene in the motion video for which the preference is set until a preset time duration has elapsed.

13. The terminal of claim 10, wherein if the event comprises a change of the manner in which the preference item is displayed, the controller changes at least one of the color, character size, and font of the preference item for display.

14. The terminal of claim 10, wherein if the event comprises a display of a pop-up window, the controller controls the display unit to display the preference item with the pop-up window.

15. The terminal of claim 10, wherein if the event comprises an alarm, the controller controls the display unit to display the preference item and activates at least one of a vibration alarm, a lamp alarm, and an audio alarm.

16. The terminal of claim 10, wherein the preference item comprises at least one of an audio file, a motion video file, an image file, a text file, and a menu stored in the portable terminal.

* * * * *